United States Patent [19]
Ross

[11] 3,909,508
[45] Sept. 30, 1975

[54] WOVEN ELECTRICALLY CONDUCTIVE CABLE AND METHOD

[75] Inventor: Edgar A. Ross, Greenville, S.C.

[73] Assignee: Southern Weaving Company, Mauldin, S.C.

[22] Filed: Dec. 26, 1973

[21] Appl. No.: 427,561

Related U.S. Application Data

[63] Continuation of Ser. No. 38,469, May 18, 1970, abandoned.

[52] U.S. Cl............ 174/117 M; 29/592; 139/425 R
[51] Int. Cl.² ........................................ H01B 7/00
[58] Field of Search ............ 174/117 M; 139/425 R; 29/592

[56] References Cited
UNITED STATES PATENTS

| | | | |
|---|---|---|---|
| 1,965,542 | 7/1934 | Colvin | 139/425 R |
| 3,197,555 | 7/1965 | Mittler | 139/425 R |
| 3,495,025 | 2/1970 | Ross | 174/117 M |

*Primary Examiner*—E. A. Goldberg
*Attorney, Agent, or Firm*—Curtis, Morris & Safford

[57] ABSTRACT

A plurality of parallel conductors and a single continuous weft thread are woven together in a two-up, two-down twill weave pattern. The conductors comprise the warp fibers of the cable. The ends of the wires in the cable are separated simply by pulling one end of the weft thread to free the ends of the wires from the weave, and then stripping off any insulating coating covering the wire ends.

9 Claims, 1 Drawing Figure

U.S. Patent  Sept. 30, 1975  3,909,508
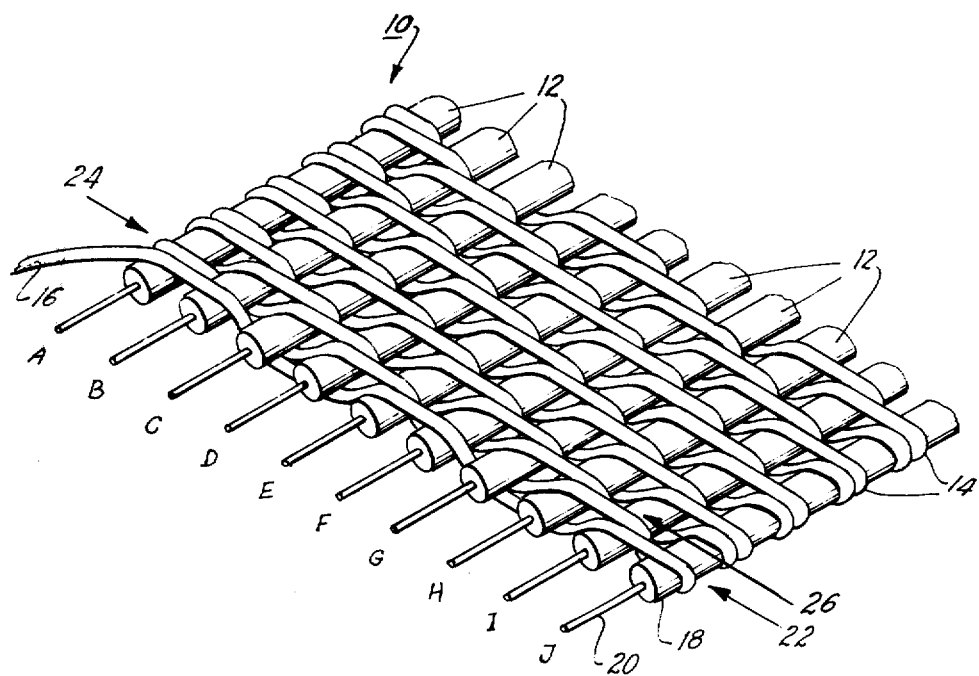
INVENTOR.
EDGAR A. ROSS
BY
Curtis, Morris + Safford
ATTORNEYS

WOVEN ELECTRICALLY CONDUCTIVE CABLE AND METHOD

This is a continuation of application Ser. No. 38,469, filed May 18, 1970 now abandoned.

The invention relates to electrical cables formed by weaving techniques, and particularly relates to flat woven cable and to methods of stripping the ends of such cable.

In woven cable, as in most cables, stripping the insulation from the ends of the conductors is a problem to which considerable attention usually must be given. In many prior types of woven cable, it is necessary to insert a cutting blade between two adjacent conductors and cut the weft threads for a certain length in order to free the wires from the weave so that insulation can be stripped from them and they can be connected to devices in which the cable is to be used.

It is one object of the present invention to provide a woven cable in which the separation of the cable ends is easier and faster to accomplish. It is another object of the present invention to provide a woven cable stripping method which is easy, rapid and simple to perform. It is another object of the present invention to provide a woven cable which can be fabricated relatively simply and inexpensively, and yet has a high degree of structural stability.

In accordance with the present invention, the foregoing objects are met by the provision of a woven cable having a plurality of elongated conductors with at least one weft thread woven between and binding the conductors together in a staggered weave pattern. Preferably, the weave pattern is a twill weave in which the weft thread passes over at least two adjacent conductors in each of a plurality of passes through the cable. Also provided is a cable stripping method in which the free end of the weft thread of the cable is pulled to free the ends of the conductors from the cable and facilitate stripping by normal procedures.

The foregoing and other objects and advantages of the invention will be pointed out in or apparent from the following description and drawings. The single figure of the drawings illustrates the preferred embodiment of woven cable constructed in accordance with the present invention.

The drawing shows a short length of woven cable 10 which includes a plurality of elongated conductors 12 bound together and interwoven with a single continuous weft thread 14. Each conductor has a coating 18 of insulation covering a wire 20. One end 16 of the weft thread 14 hangs free so that it can be grasped by a person desiring to separate the conductors.

In accordance with the present invention, the weft thread 14 and the conductors 12 are woven together in a twill pattern, Specifically, this pattern is a two-up, two-down pattern. That is, the first section 22 of the weft thread 14 passes over two wires A and B, under the next two wires C and D, over the next two wires E and F, and so forth. The second section 24 of the weft thread also passes over and under the wires in a two-up, two-down pattern, but with the pattern displaced laterally by one wire. That is, the thread passes over wire A, under wires B and C, over wires D and E, under wires E and F, and so forth. This staggering arrangement is continued throughout the weaving of the cable 10.

Staggering of the weave pattern has a distinct advantage in that it binds the conductors 12 together quite securely and holds them against slipping in either the lateral or the longitudinal direction, and yet does so without the use of any warp threads. This is highly advantageous in that it allows the weft thread 14 to be removed from the ends of the conductors simply by pulling the loose end 16. Since there are no warp threads to become entangled with the weft thread as it is pulled, the thread pulls loose relatively easy and thus permits freeing of the ends of the conductors from one another rapidly and easily. Moreover, since the weft thread is continuous, several parallel sections such as sections 22 and 24 can be pulled free in rapid succession. Thus, one wishing to separate the ends of the conductors simply pulls on the loose end 16 and unzips the end of the cable quickly and efficiently, and then removes the insulation coating 18 by conventional techniques. If the conductors 12 do not have any insulation coating on them, unzipping the wires is all that need be done to strip them.

The weave pattern in which the weft thread 14 passes over at least two of the conductors on each pass through the cable 10 is advantageous in that it distributes the pull of the weft thread over a greater surface area and does not tend to cut into the insulation coating 18 on the wires as greatly as it would if only one wire were covered in the passes of the thread through the cable.

A wide variety of variations in the weave pattern can be made in accordance with the teachings of the present invention. For example, the two-up, two-down pattern need not be adhered to. The threads can pass over only one, or over three or more conductors and still retain many of the advantages of the present invention. Furthermore, although the twill weave shown in the drawing is what is known as a straight twill weave, a herringbone twill weave pattern can be used with equal effectiveness. In fact, the staggering of sections of the weave pattern need not be in any particular pattern but can be in a more or less random pattern, as long as enough staggering is done to insure lateral and longitudinal stability of the wires in the cable.

Although it is desirable to avoid the use of warp threads in the cable, it is not necessary to entirely avoid the use of such threads. For example, an advantageous modification of the cable structure shown can be made by providing a strip of fabric, at one or more positions in the cable, so as to separate adjacent conductors in the manner described in my U.S. Pat. No. 3,495,025. This facilitates folding of the cable in the manner described in that patent. The wrap threads used in such an arrangement, whose number is relatively small, do not interfere significantly with the unzipping of the weft threads from the cable.

The material from which the weft thread 14 is made is not particularly critical; it can be any of the wide variety of the man-made fibers such as fiberglass, nylon and the like, or it can be a natural fiber material. The material preferably is electrically non-conductive, but it need not be so as long as some means is provided for insulating the conductors 12 from one another.

As has been noted above, the cable can be made either with non-insulated bare wire, or with wire having an integral insulating coating. If the cable is made with bare wire, care should be taken to insure that the warp thread forms an insulating barrier between each pair of adjacent wires. Also, the spacing between the wires should be sufficient to prevent contact of the wires with one another.

The above description of the invention is intended to be illustrative and not limiting. Various changes or modifications in the embodiments described may occur to those skilled in the art and these can be made without departing from the spirit or scope of the invention.

I claim:

1. A woven electrically conductive cable comprising, in combination, a plurality of elongated, substantially parallel electrical conductors forming warp members of said cable, means for insulating said conductors with respect to one another, easily removable binding means for said conductors, said binding means comprising only a single continuous weft thread woven between and binding said conductors together in a pattern which is staggered in the weft direction, said weft thread passing over at least two adjacent conductors in each of a plurality of passes through said cable, one end of said weft thread being not bound with said conductors so that it is free to be pulled longitudinally of said conductors to free one end of said conductors from said binding means.

2. A cable as in claim 1 in which said conductors comprise substantially the only warp fibers in said cable.

3. A cable as in claim 1 in which each of said conductors has an integral coating of insulation.

4. A woven electrically conductive cable comprising a plurality of substantially parallel elongated electrical conductors forming warp members of said cable and woven togther with easily removable binding means for said conductors, said binding means comprising only a single continuous weft thread, said conductors being woven with said weft thread in a twill pattern, one end of said weft thread being not bound with said conductors so that it is free to be pulled longitudinally of said conductors to free one end of said conductors from said binding means.

5. A cable as in claim 4 in which said twill pattern is a straight two-up, two-down twill pattern.

6. A cable as in claim 4 in which each of said conductors has an integral insulating coating.

7. A method of preparing a woven, electrically conductive cable for making electrical connections to a plurality of elongated, substantially parallel electrical conductors therein, said method comprising the steps of providing a woven electrically conductive cable having a plurality of elongated electrical conductors, only a single continuous weft thread woven between and binding said conductors together in a pattern which is staggered in the weft direction, said weft thread passing over at least two adjacent conductors in each of a plurality of passes through said cable, one end of said weft thread being not bound with said conductors, and pulling said weft thread in the longitudinal direction of said conductors to remove said thread from said cable at an end of said cable.

8. A method as in claim 7 in which said weft thread and said conductors are woven together in a twill pattern with said conductors being substantially the only warp fibers in the cable.

9. A method as in claim 7 in which each of said conductors has an integral coating of insulation, and including the step of stripping said insulation from the ends of selected ones of said conductors from which said thread has been pulled.

* * * * *

REEXAMINATION CERTIFICATE (629th)
United States Patent [19]
Ross

[11] B1 3,909,508
[45] Certificate Issued  Feb. 10, 1987

[54] WOVEN ELECTRICALLY CONDUCTIVE CABLE AND METHOD

[75] Inventor: Edgar A. Ross, Greenville, S.C.

[73] Assignee: Woven Electronics Corp., Greenville, S.C.

Reexamination Request:
No. 90/000,928, Dec. 26, 1985

Reexamination Certificate for:
Patent No.: 3,909,508
Issued: Sep. 30, 1975
Appl. No.: 427,561
Filed: Dec. 26, 1973

Related U.S. Application Data

[63] Continuation of Ser. No. 38,469, May 18, 1970, abandoned.

[51] Int. Cl.[4] ............................................. H01B 7/00
[52] U.S. Cl. .......................... 174/117 M; 29/592 R; 139/425 R
[58] Field of Search ............ 174/72 A, 72 TR, 117 R, 174/117 F, 117 FF, 117 M; 139/425 R; 29/592 R, 825, 868, 755; 156/47, 55; 336/191; 338/208; 343/897

[56] References Cited
U.S. PATENT DOCUMENTS

| | | | |
|---|---|---|---|
| 417,402 | 12/1889 | Balsley | 174/117 M |
| 1,965,542 | 7/1934 | Colvin, Jr. | 139/425 R X |
| 3,197,555 | 7/1965 | Mittler | 139/425 R X |
| 3,495,025 | 2/1970 | Ross | 174/117 M X |

FOREIGN PATENT DOCUMENTS

235566 of 1927 United Kingdom ................ 343/897

OTHER PUBLICATIONS

Printed brochure entitled "Wovacon Woven Cables", published by Murdock Webbing Company, Inc., Central Falls, Rhode Island, publication date unknown but represented to have been published before May of 1969. (S0158 0050) Conference: Proceedings of the 18th International Wire and Cable Symposium, Atlantic City, N.J., USA, Dec. 3-5, 1969, "Ancient Art Turns Modern-The Woven Cable", 18 pages, Electroweave, Inc. (Alan P. Mandel and Kenneth Sennett).

*Primary Examiner*—Laramie E. Askin
*Attorney, Agent, or Firm*—Cort Flint

[57] ABSTRACT

A plurality of parallel conductors and a single continuous weft thread are woven together in a two-up, two-down twill weave pattern. The conductors comprise the warp fibers of the cable. The ends of the wires in the cable are separated simply by pulling one end of the weft thread to free the ends of the wires from the weave, and then stripping off any insulating coating covering the wire ends.

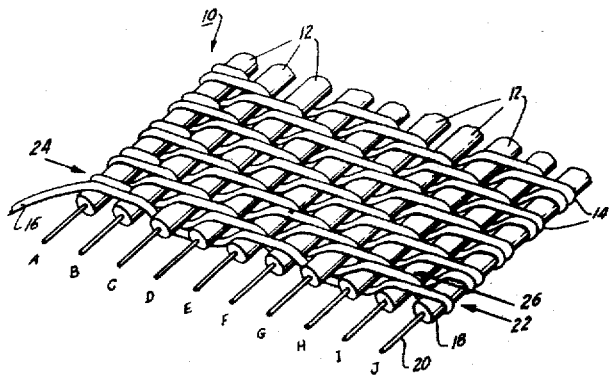

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 53–66:

In accordance with the present invention, the weft thread 14 and the conductors 12 are woven together in a twill pattern. Specifically, this pattern is a two-up, two-down pattern. That is, the first section 22 of the weft thread 14 passes over two wires A and B, under the next two wires C and D, over the next two wires E and F, and so forth. The second section 24 of the weft thread also passes over and under the wires in a two-up, two-down pattern, but with the pattern displaced laterally by one wire. That is, the thread passes over wire A, under wires B and C, over wires D and E, under wires [E] *F* and [F] *G*, and so forth. This staggering arrangement is continued throughout the weaving of the cable 10.

Column 1, line 66 to Column 2, line 19:

Staggering of the weave pattern has a distinct advantage in that it binds the conductors 12 together quite securely and holds them against slipping in either the lateral or the longitudinal direction, and yet does so without the use of any warp threads. This is highly [advantageious] *advantageous* in that it allows the weft thread 14 to be removed from the ends of the conductors simply by pulling the loose end 16. Since there are no warp threads to become entangled with the weft thread as it is pulled, the thread pulls loose relatively easy and thus permits freeing of the ends of the conductors from one another rapidly and easily. Moreover, since the weft thread is continuous, several parallel sections such as sections 22 and 24 can be pulled free in rapid succession. Thus, one wishing to separate the ends of the conductors simply pulls on the loose end 16 and unzips the end of the cable quickly and efficiently, and then removes the insulation coating 18 by conventional techniques. If the conductors 12 do not have any insulation coating on them, unzipping the wires is all that need be done to strip them.

Column 2, lines 28–41:

A wide variety of variations in the weave pattern can be made in accordance with the teachings of the present invention. For example, the two-up, two-down pattern need not be adhered to. The threads can pass over only one, or over three or more conductors and still retain many of the advantages of the present invention. Furthermore, although the twill weave shown in the drawing is what is known as a straight twill weave, a herringbone twill weave pattern can be used with equal effectiveness. In fact, the staggering of sections of the weave pattern need not be in any particular pattern but can be in a more or less random pattern, as long as enough staggering is done to [insure] *ensure* lateral and longitudinal stability of the wires in the cable.

Column 2, line 63 to Column 3, line 2:

As has been noted above, the cable can be made either with non-insulated bare wire, or with wire having an integral insulating coating. If the cable is made with bare wire, care should be taken to [insure] *ensure* that the warp thread forms an insulating barrier between each pair of adjacent wires. Also, the spacing between the wires should be sufficient to prevent contact of the wires with one another.

AS A RESULT OF REEXAMINATION, IT HAS BEEN DETERMINED THAT:

Claim 8 is cancelled.

Claims 1–7 and 9 are determined to be patentable as amended.

New claims 10–12 are added and determined to be patentable.

1. A woven electrically conductive cable comprising, in combination, a plurality of elongated, substantially parallel electrical conductors forming warp members of said cable, means for insulating said conductors with respect to one another, easily removable binding means for said conductors, said binding means comprising only a single continuous weft thread woven between and binding said conductors together in a *twill weave* pattern which is staggered in the weft direction, said weft thread passing over at least two adjacent conductors in each [of a plurality of passes] *pass* through said cable *in a manner that the point of interweaving of said weft thread and said conductors is displaced in the weft direction by one conductor on each pass through said cable, and* one end of said weft thread being not bound with said conductors so that it is free to be pulled longitudinally of said conductors to free one end of said conductors from said binding means.

2. A cable as in claim 1 in which said conductors comprise substantially the only warp [fibers] *members* in said cable.

3. A cable as in claim 1 in which each of said *substantially parallel* conductors [has] *consists of a single generally straight warp conductor wire having* an integral coating of insulation.

4. A woven electrically conductive cable comprising a plurality of substantially parallel elongated electrical conductors forming warp members of said cable and woven [togther] *together* with easily removable binding means for said conductors, said binding means comprising only a single continuous weft thread, said conductors being woven with said weft thread *passing over at least two of said substantially parallel conductors in each pass through said cable* in a twill *weave* pattern *in a manner that the point of interweaving of said weft thread and said conductors is displaced in the weft direction by one conductor on each pass through said cable, and* one end of said weft thread being not bound with said conductors so that it is free to be pulled longitudinally of said conductors to free one end of said conductors from said binding means.

5. A cable as in claim 4 in which said twill *weave* pattern is a straight two-up, two-down twill *weave* pattern.

6. A cable as in claim 4 in which each of said *substantially parallel* conductors [has] *consists of a single generally straight warp conductor wire having* an integral insulating coating.

7. A method of preparing a woven, electrically conductive cable for making electrical connections to a plurality of elongated, substantially parallel electrical conductors therein, said method comprising the steps of providing a woven electrically conductive cable having a plurality of elongated electrical conductors, only a single continuous weft thread woven between and binding said conductors together in a *twill weave* pattern which is staggered in the weft direction, said weft thread passing over at least two adjacent conductors in each [of a plurality of passes] *pass* through said cable *in a manner that the point of interweaving of said weft thread and said conductors is displaced in the weft direction by one conductor on each pass through said cable*, one end of said weft thread being not bound with said conductors, and pulling said weft thread in the longitudinal direction of said conductors to remove said *weft* thread from said cable at an end of said cable.

9. A method as in claim 7 in which each of said *substantially parallel* conductors [has] *consists of a single generally straight warp conductor wire having* an integral coating of insulation, and including the step of stripping said insulation from the ends of selected ones of said conductors from which said *weft* thread has been pulled.

10. The method of claim 7 including providing said woven cable with said weft thread woven alternately under two adjacent conductors and over two adjacent conductors through each pass across said cable in said twill weave pattern.

11. *A method of preparing a woven electrically conductive cable for making electrical connections to a plurality of elongated electrical conductors extending in a warp direction in said cable generally in a side-by-side parallel manner, wherein said method comprises:*

*providing a plurality of elongated electrical conductors each having an outer layer of insulation extending in a generally side-by-side parallel manner in a warp direction;*

*weaving only a single continuous weft thread between and binding said conductors together in a twill weave pattern with the weft thread staggered in the weft direction;*

*weaving said staggered weft thread in such a manner that said point of interweaving of said weft thread and said conductors is displaced laterally by one conductor on each pass of said weft thread through said cable and adjacent conductors are thereby successively bound together across the width and along the length of said cable;*

*weaving said weft thread alternately over at least two adjacent conductors and under at least two adjacent conductors in each pass of said weft thread through said cable to distribute the load of said weft thread over a combined surface area of a group of said conductors containing said at least two conductors to reduce distortion and cutting of said insulation of said conductors, one end of said weft conductor being not bound with said conductors so that it is free to be pulled longitudinally of said conductors; and*

*pulling said one end of said weft thread longitudinally of said conductors to remove said weft thread at an end of said cable and free the ends of said conductors for making electrical connection.*

*12. A method as in claim 11 which includes providing each of said substantially parallel conductors in the form of a generally straight warp conductor wire having an integral coating of insulation.*

* * * * *